(12) United States Patent
Nakamura et al.

(10) Patent No.: US 6,948,400 B2
(45) Date of Patent: Sep. 27, 2005

(54) BACKLASH CLUTCH AND JOINT MECHANISM FOR A ROBOT COMPRISING THE CLUTCH

(75) Inventors: Yoshihiko Nakamura, Tokyo (JP); Masafumi Okada, Tokyo (JP); Tatsuya Goto, Kobe (JP)

(73) Assignee: The University of Tokyo, Tokyo (JP)

( * ) Notice: Subject to any disclaimer, the term of this patent is extended or adjusted under 35 U.S.C. 154(b) by 128 days.

(21) Appl. No.: 10/359,726

(22) Filed: Feb. 7, 2003

(65) Prior Publication Data

US 2004/0016315 A1 Jan. 29, 2004

(30) Foreign Application Priority Data

Feb. 12, 2002 (JP) ........................................ 2002-034076

(51) Int. Cl.[7] ................................................ B25J 17/00
(52) U.S. Cl. ...................... 74/490.05; 901/28; 403/117
(58) Field of Search ...................... 74/490.01, 490.03, 74/490.04, 490.05, 490.06; 901/15, 19, 21, 23, 27, 28, 29; 403/61, 113, 116, 117, 152

(56) References Cited

U.S. PATENT DOCUMENTS

| | | | | | |
|---|---|---|---|---|---|
| 707,547 A | * | 8/1902 | Brooke | ........................ | 403/117 |
| 1,419,791 A | * | 6/1922 | Wehrman | .................... | 403/117 |
| 1,883,322 A | * | 10/1932 | Abbott | ........................ | 403/117 |
| 2,400,032 A | * | 5/1946 | Talbot | .......................... | 623/44 |
| 4,353,361 A | * | 10/1982 | Foster | .......................... | 602/16 |
| 4,544,203 A | * | 10/1985 | Younger et al. | ............ | 297/391 |
| 4,596,422 A | * | 6/1986 | Stahel | ..................... | 297/378.1 |
| 4,906,121 A | * | 3/1990 | Torii et al. | ..................... | 403/78 |
| 5,044,360 A | * | 9/1991 | Janke | .......................... | 602/16 |
| 5,427,466 A | * | 6/1995 | Kennedy | ..................... | 403/117 |
| 5,655,741 A | * | 8/1997 | Watkins | ................. | 248/289.11 |
| 5,873,847 A | * | 2/1999 | Bennett et al. | ............... | 602/16 |
| 6,146,044 A | * | 11/2000 | Calvet | ........................ | 403/119 |

FOREIGN PATENT DOCUMENTS

| | | |
|---|---|---|
| CN | 2382889 | 6/2000 |
| JP | U 56-62892 | 5/1981 |
| JP | U 58-116823 | 8/1983 |
| JP | U 6-28350 | 4/1994 |
| KR | 1999-18124 | 3/1995 |

* cited by examiner

Primary Examiner—David M. Fenstermacher
(74) Attorney, Agent, or Firm—Oliff & Berridge, PLC

(57) ABSTRACT

A backlash comprises a first rotation member and a second rotation member, each of which is provided rotatably-about the same axis, and which are engageable together in a rotating direction of the members by driving contact between respective radial extension surfaces thereof, and where a backlash gap is provided between the respective radial extension surfaces of the first and the second rotation members to permit fee rotation between the first and second rotation members in a range of the backlash gap in the rotating direction of the members.

12 Claims, 8 Drawing Sheets

BACKLASH CLUTCH AND JOINT MECHANISM FOR A ROBOT COMPRISING THE CLUTCH

BACKGROUND

The present invention relates to a backlash clutch that realizes a high torque transmission characteristic and free joint mechanism. This invention also relates to a free joint mechanism for a robot comprising the clutch.

Generally, in a clutch mechanism, connection and disconnection for transmitting driving force are achieved by means of a friction mechanism. Such a friction mechanism comprises rotating members that are joined together by frictional function acts between the members to control the on-off action of the clutch. In such a clutch mechanism, using frictional action, it has been difficult to transmit a force when the force is large because slippage arises as the clutch mechanism transmits a driving force.

This phenomenon generates a significant problem when a clutch mechanism is applied to a knee joint of a humanoid robot. Typically, in a humanoid robot, such a joint mechanism provided in the body is driven by controlling actuators to generate objective paths. In particular, an actuator is used to generate high power to the knee joint.

Figure 9:
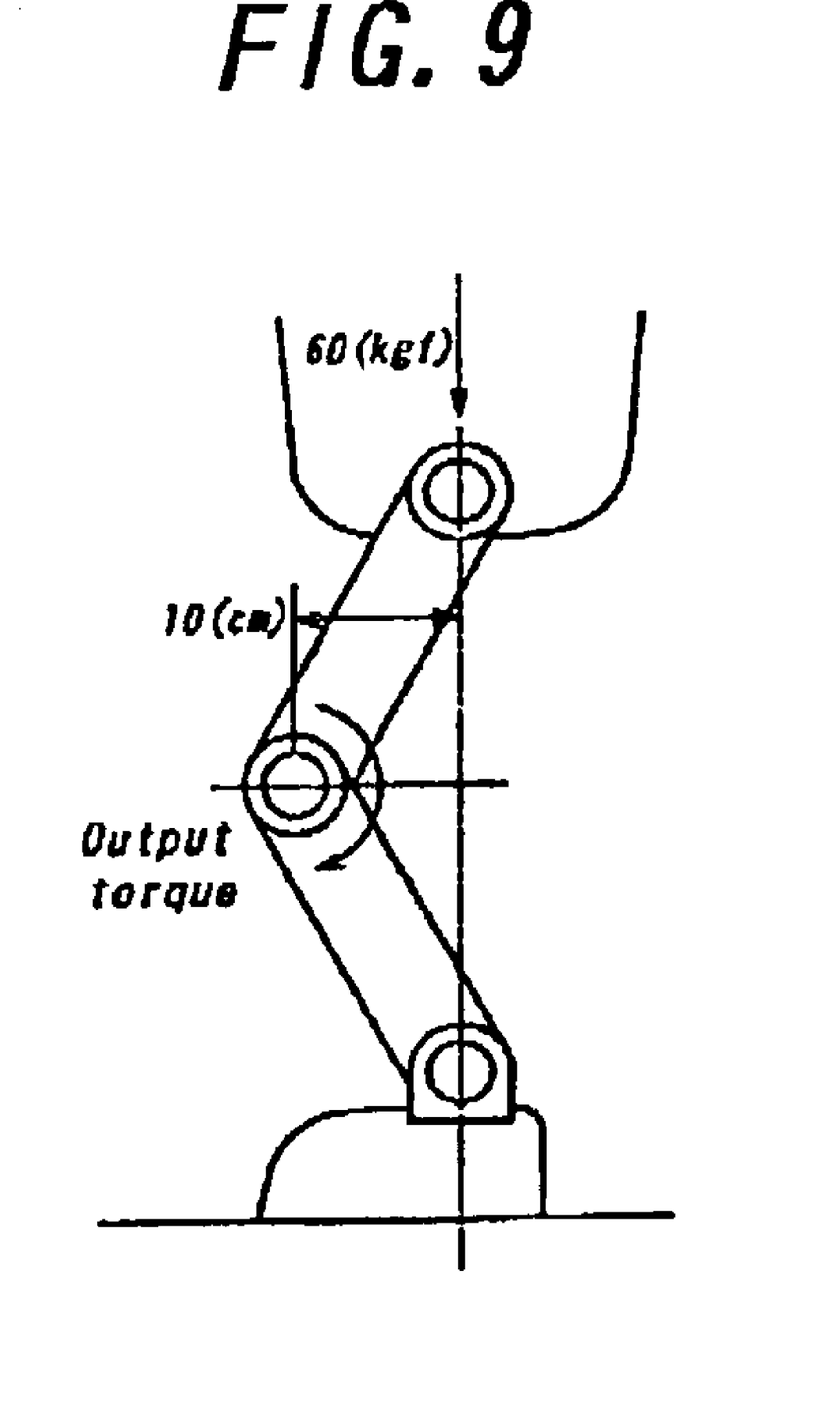
FIG. 9 is a schematic diagram showing a pose of the humanoid robot when the robot bends its knee.

When the humanoid robot rests with a posture shown in FIG. 9, assuming that the weight of the upper part from the articulatio coxae is 60 kgf and the offset length from the articulatio coxae to the knee joint is 10 cm, and that the acceleration of gravity is 9.81 m/s$^2$, the actuator that drives the knee joint must output a high torque, such as 58.86 Nm. Therefore, the knee joint mechanism must have a capability to transmit such a high torque.

In general, the knee joint mechanism is composed of a motor generating high power and reduction gears having a high gear ratio. On the other hand, in a human's walking motion, the knee joint of a leg acts as a free joint when the leg is not engaging the ground (grounded or grounding). It is contemplated that such an action of the knee joint has the following effects;

There is no need to use extra force.

When a human moves a leg forward, the knee of the leg moves freely in accordance with inertial force.

When the leg touches down, an impulsive reaction force that acts on the leg eases up as the leg heads for ground at an adequate angle, naturally.

However, a conventional knee joint mechanism has difficulty realizing a free joint characteristic following a reactive force, where control of the walking motion is performed so as to maintain the knee with a desired angle when the leg is not grounded.

To ensure that the knee joint has such a free moving condition, it is contemplated to incorporate a clutch mechanism into the reduction gears. However, a general clutch mechanism is a friction-type clutch, such as the above-mentioned clutch, and it slips at high torque, such that it is difficult to transmit high torque. Therefore, the clutch mechanism can only be attached to the input shaft side of the reduction gears. Consequently, the need exists for a clutch mechanism for a knee joint of a humanoid robot that can provide output at the shaft side of the reduction gears, as a mechanism that can both transmit high torque and maintain a free moving condition.

It is therefore an object of the present invention to provide a clutch mechanism capable of transmitting high torque and maintaining a free moving condition, and a joint mechanism of a robot comprising such a clutch mechanism. In particular, an object of this clutch mechanism is to realize a walking motion that has the following advantages when it is used as a knee joint:

(1) Transmits a large driving force.
(2) Achieves a free joint.
  (a) Does not need to use extra force.
  (b) Realizes free motion.
  (c) Absorbs an impulsive/reaction force at landing (grounding).

SUMMARY OF THE INVENTION

A backlash clutch of this invention which advantageously achieves the above-mentioned object comprises a first rotation member and a second rotation member, each of which is provided rotatably about the same axis, and which are engageable together in a rotating direction of the members by driving contact between respective radial extension surfaces thereof, and where a backlash gap is provided between the respective radial extension surfaces of the first and the second rotation members to permit fee rotation between the first and second rotation members in a range of the backlash gap in the rotating direction of the members.

According to this backlash clutch, relative rotation of the first and second rotation members is permitted until the gap between the respective radial extension surfaces of these rotation members in the rotating direction of these members equal to is a backlash gap; this backlash clutch is able to achieve the following effects:

(a) Achieve a free joint.
(b) Transmit a high torque when the clutch is in a coupled condition.

A joint mechanism for a robot comprises such a backlash clutch, two composing members that form an arm or a leg of a robot and are connected together rotatably, where one of the composing members supports one of the first and second rotation members rotatably at the rotation axis of the composing member, and the other one of the composing members fixedly supports the other one of the first and second rotation members, and drive means for driving one of the first and second rotation members rotatably relative to the composing member that supports the rotation members rotatably.

According to this aspect, a joint mechanism for a robot comprising such a backlash clutch can obtain the following effects:

(c) Realize a reaction force-following mechanism that follows a reaction force of a free joint.
(d) Absorb an impulsive force by means of the reaction force following the motion of the reaction force-following mechanism.
(e) Avoid consumption of unprofitable energy.

BRIEF DESCRIPTION OF THE DRAWINGS

FIG. 3, including

DETAILED DESCRIPTION OF THE PREFERRED EMBODIMENTS

Figure 1:
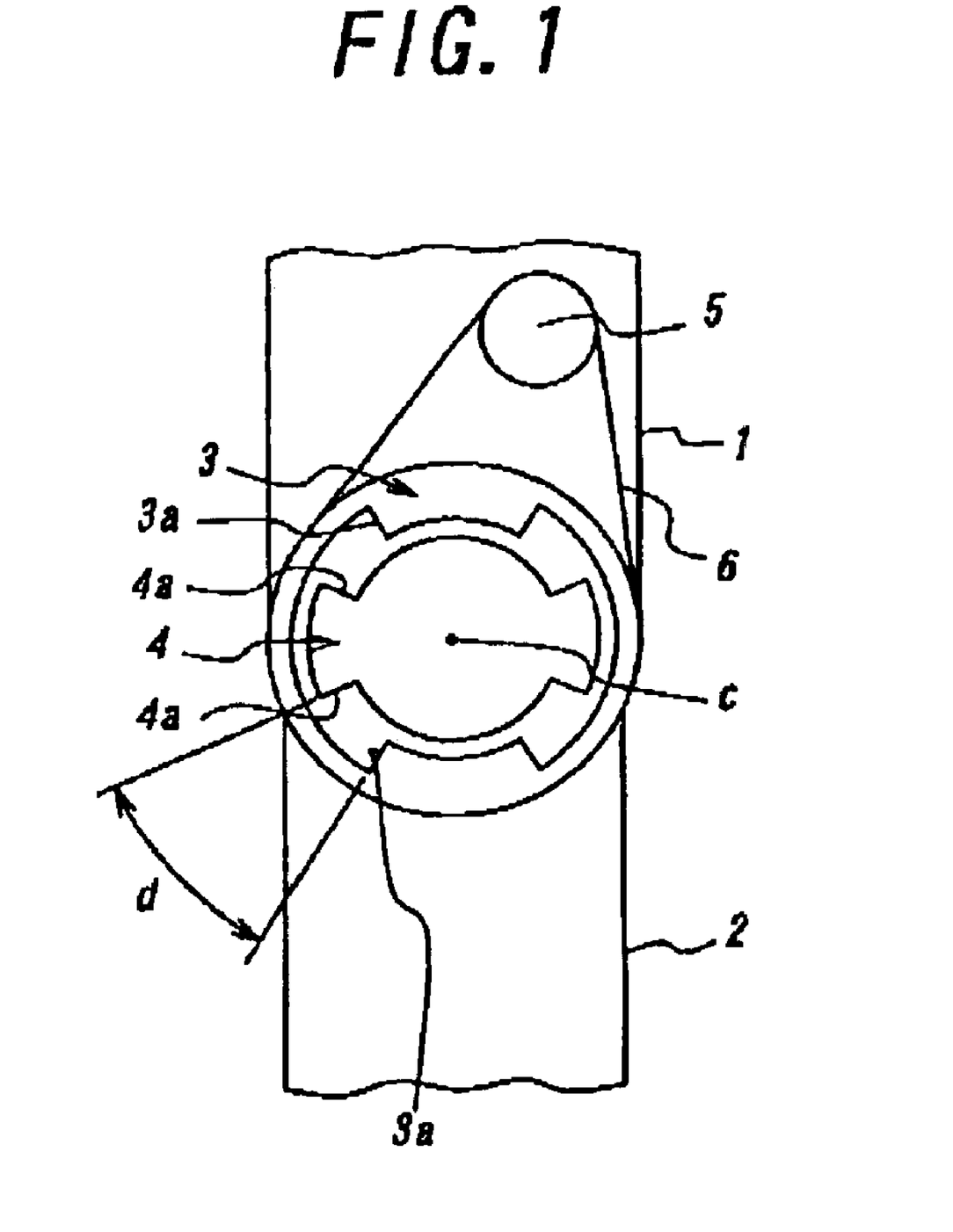
FIG. 1 is a schematic front view showing a knee joint mechanism of a humanoid robot as one embodiment of the backlash clutch and the robot comprising the clutch according to the present invention.

The present invention will be further explained below with reference to a preferred embodiment shown in the accompanying drawings. FIG. 1 is a schematic front view showing a knee joint mechanism of a humanoid robot as one embodiment of the backlash clutch and a robot comprising the clutch according to the present invention. In FIG. 1, numeral 1 represents an upper part of a leg as one member of one leg of a humanoid robot, numeral 2 represents a lower part of a leg as another member of the leg, and this lower part of the leg is rotatably connected together with the upper part of the leg around the axis C. Numeral 3 represents a first rotation member and constitutes a portion of a backlash clutch of the embodiment of this invention; numeral 4 represents a second rotation member and constitutes a portion of a backlash clutch of the embodiment of this invention. Numeral 5 represents a pulley provided to output a driving force of a shaft of a high output power motor with reduction gears, and numeral 6 represents a belt.

In this knee joint mechanism, first rotation member 3 and second rotation member 4 are located on identical axis C to be able to rotate relatively, where first rotation member 3 is rotatably supported by the upper part of leg 1 around the axis C, and second rotation member 4 is fixedly integrated with the lower part of leg 2. Furthermore, first rotation member 3 and second rotation member 4 have radial extension surfaces 3a, 4a, respectively, where radial extension surfaces 3a, 4a are relatively rotatable so as to contact each other, and a gap (backlash) is formed between the radial extension surfaces of the rotation members in the direction of rotation of the rotation members 3, 4.

Additionally, a belt transmission mechanism using a high power output motor with reduction gears, the pulley 5 and the belt 6 constitutes drive means, and the first and second rotation members, the motor and the drive means constitute a knee joint mechanism of the present embodiment. In this embodiment, the drive means is configured by transmitting output power of the motor to the first rotation member 3 via pulley 5 and belt 6. However, the drive means of the knee joint mechanism for a robot of this invention is not limited to the aforementioned drive means.

The backlash clutch and the knee joint mechanism for a robot of this embodiment transmit rotational driving movement and realize a free condition by the following procedures.

(1) Transmit driving force

Figure 2:
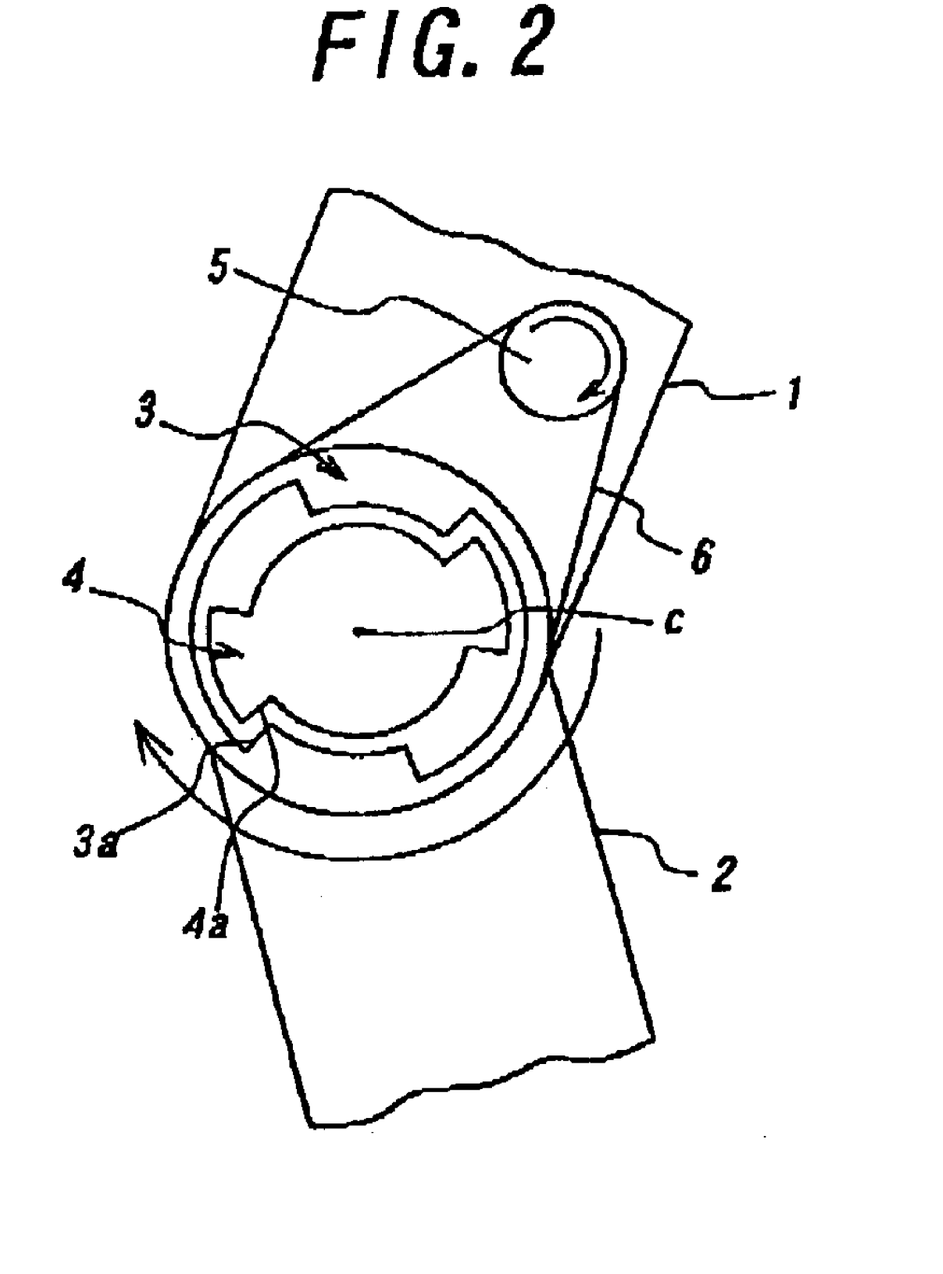
FIG. 2 is a schematic diagram of the knee joint mechanism shown in FIG. 1, which transmits torque at the peripheral gap between the radial extension surfaces of the first and the second rotation members and is zero.

In this joint mechanism, as shown in FIG. 2, torque is transmitted in the direction represented by the arrow in the drawing by means of setting the peripheral gap d between the radial extension surface 3a of the first rotation member 3 and the radial extension surface 4a of the second rotation member 4 to zero (for convenience, a slight gap is depicted in FIG. 2 between these surfaces). In this case, the first rotation member 3 and the second rotation member 4 make surface contact by contacting radial extension surfaces 3a and 4a to each other, where the extension surfaces are perpendicular to the direction of the rotating force, so as to ensure that these members transmit large torque. In this joint mechanism, since the direction of transmitting the driving force is one way, response with a time lag arises if this mechanism uses a servomechanism to control the rotation angle. However, in a mechanism such as a knee joint of a humanoid robot, the rotating force always acts in a constant direction, so this joint mechanism is performed effectively. This joint mechanism is suited to maintain the pose of a condition of bending the knee to transmit a high torque as shown in FIG. 9.

(2) Realize free moving condition

Figure 3A:
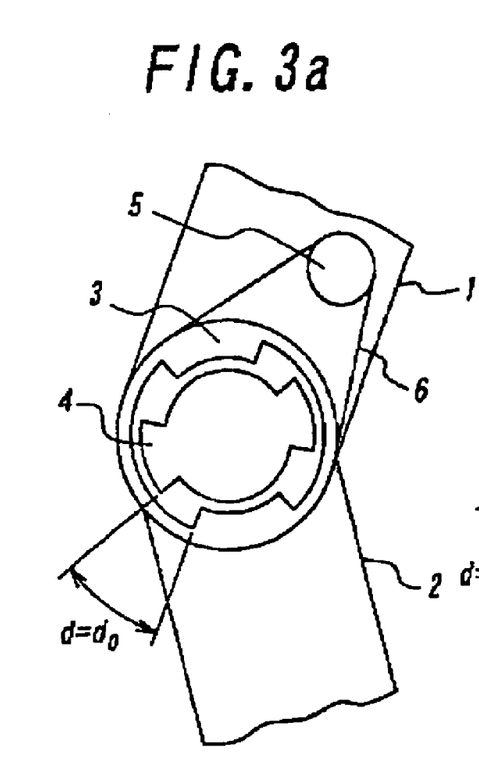
FIGS. 3a, 3b and 3c, is a schematic diagram of the knee joint mechanism shown in FIGS. 1 and 2, showing the joint in a free joint condition.
Figure 3B:
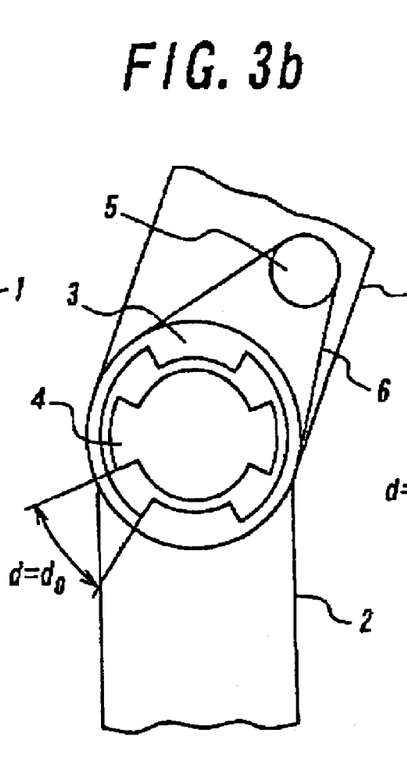
Figure 3C:
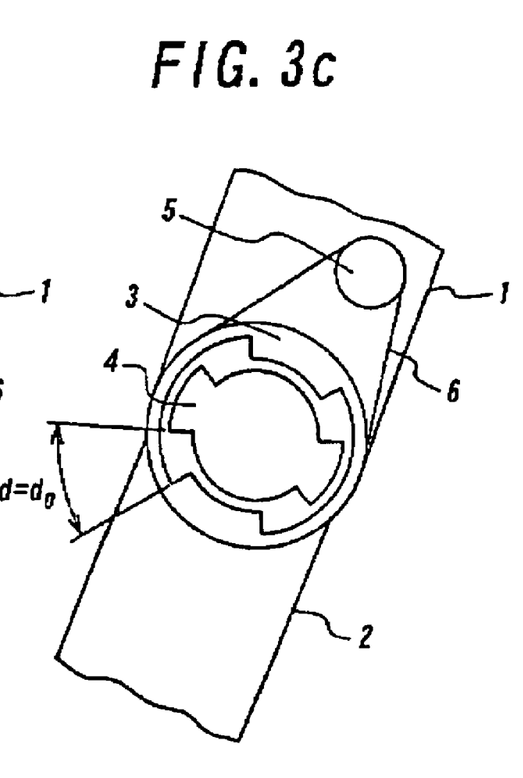

In such a joint mechanism, as shown in FIG. 3a–3c, for example, a free moving condition is realized by controlling the rotation angle of the first rotation member 3 so as to maintain the gap d at a constant value $d_0$, that is, adapting to rotation of the second rotation member 4 caused by a swing of the lower part of the leg 2. In general, an actuator with reduction gears having a high gear ratio to output a high torque cannot generate a revolving speed sufficient to maintain the gap d at a constant value relative to free motion of the lower part of the leg 2. However, the joint mechanism of this invention is able to realize such a free moving condition of the leg because this joint has a margin of gap corresponding to the value of backlash. That is, if the rotation angle of the upper part of the leg is θ, the rotation angle of the lower part of the leg is φ, and the angle of the gap in the direction of rotation is ψ, and if θ is controlled to satisfy the equation $$\theta \cdot \phi = \psi < \psi_0,$$

then for a predetermined angle (backlash) $\psi_0$, a free joint is realized.

Figure 4:
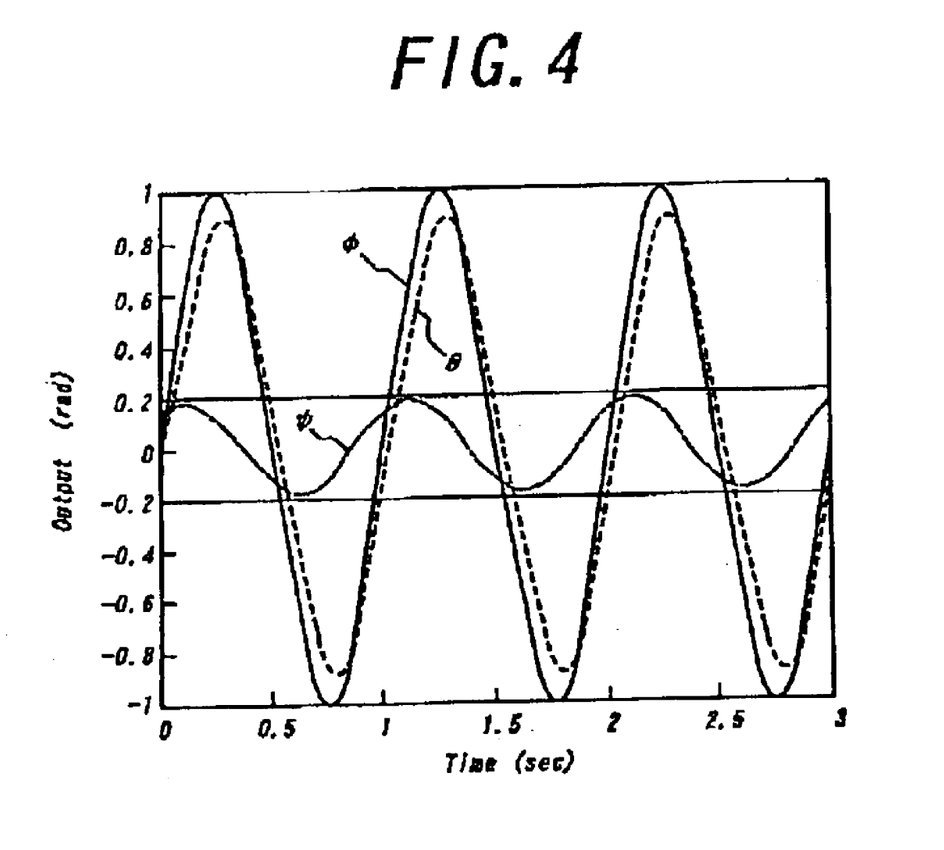
FIG. 4 is a relation diagram for the knee joint mechanism shown in FIGS. 1–3, showing a preferable example of control characteristics of the joint mechanism in a free joint condition.

FIG. 4 shows an exemplary control function in which the amplitude of θ is small by comparison with rotation angle of φ, and the value of amplitude of θ follows that of φ with phase retardation. However, the value ψ, which is a difference value between θ and φ, remains within $\psi_0$ (=±0.2 radian), so that a free moving joint condition is realized.

Figure 5A:
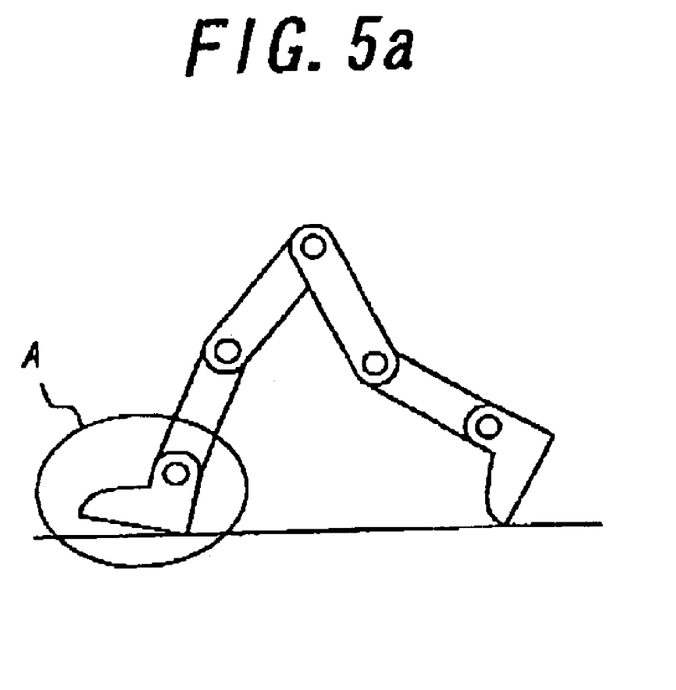
FIG. 5a is a schematic diagram showing a leg of a humanoid robot that intends to ground.
Figure 5B:
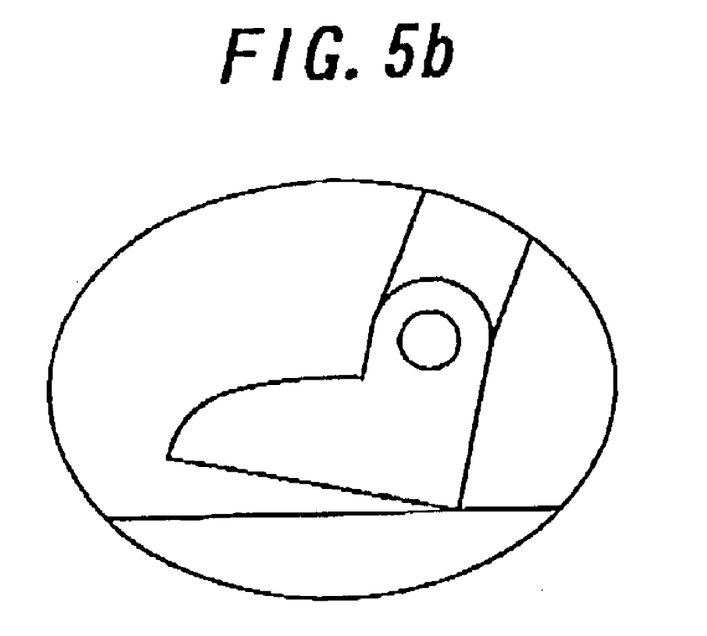
FIG. 5b is a schematic view of part A of FIG. 5a enlarged.

According to the above-mentioned backlash clutch of the present embodiment, realizing a free joint by incorporating this clutch to a knee joint of a human robot, impact shock acts on a leg at grounding as follows. That is, suppose, as shown in FIG. 5a, a leg that is not grounded goes in for grounding. At this time, as shown in FIG. 5b, the bottom of the leg (foot) will make a line contact with the floor. If the knee joint is controlled by a high output actuator to perform a desired rotation angle, then a large impact force is generated and acts on the grounding line made by contact between the leg and the ground, such that the leg is raised by a repulsive/reaction force from the floor when the floor or the bottom of the leg (foot) is made from hard material.

Figure 6A:
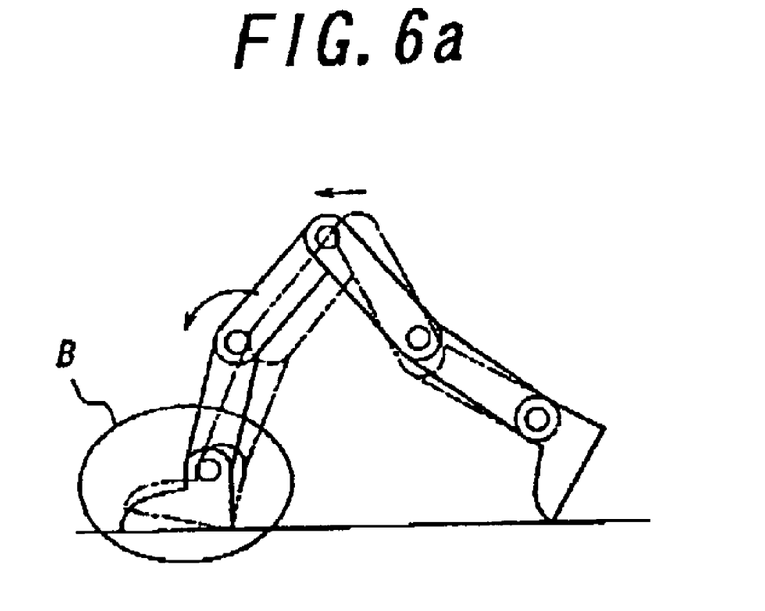
FIG. 6a is a schematic diagram showing an action of the knee joint mechanism of the present invention when a leg of a humanoid robot intends to grounding.
Figure 6B:
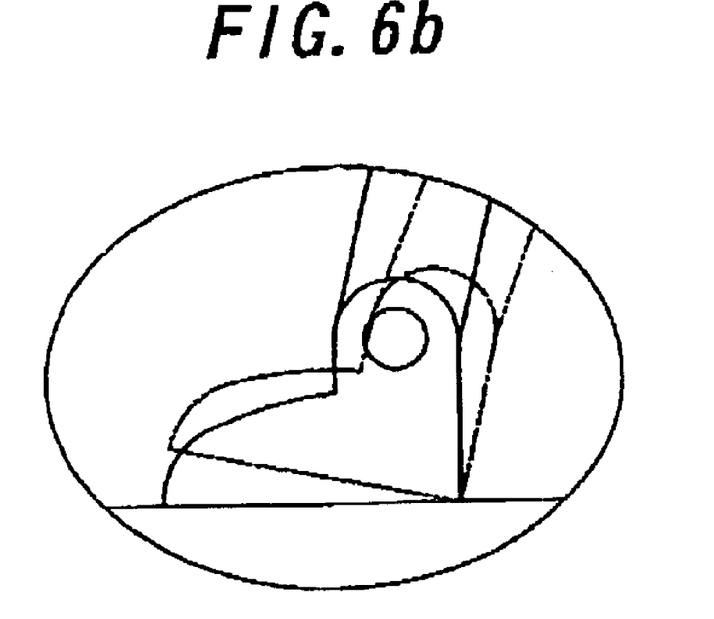
FIG. 6b is a schematic view of part B of FIG. 6a enlarged.

On the other hand, if a free joint is applied to the knee joint, the knee joint will perform a motion that follows the repulsive/reaction force from the floor (repulsive force following motion), as shown in FIG. 6a, and the bottom of the leg (foot) will ground, achieving surface contact with the floor. In this manner, the free motion action of the joint absorbs the impulsive/reaction force from the floor.

On the other hand, when a leg (right leg of the humanoid robot in FIG. 7) is advancing (not grounded), the leg creates the following paths.

Figure 7:
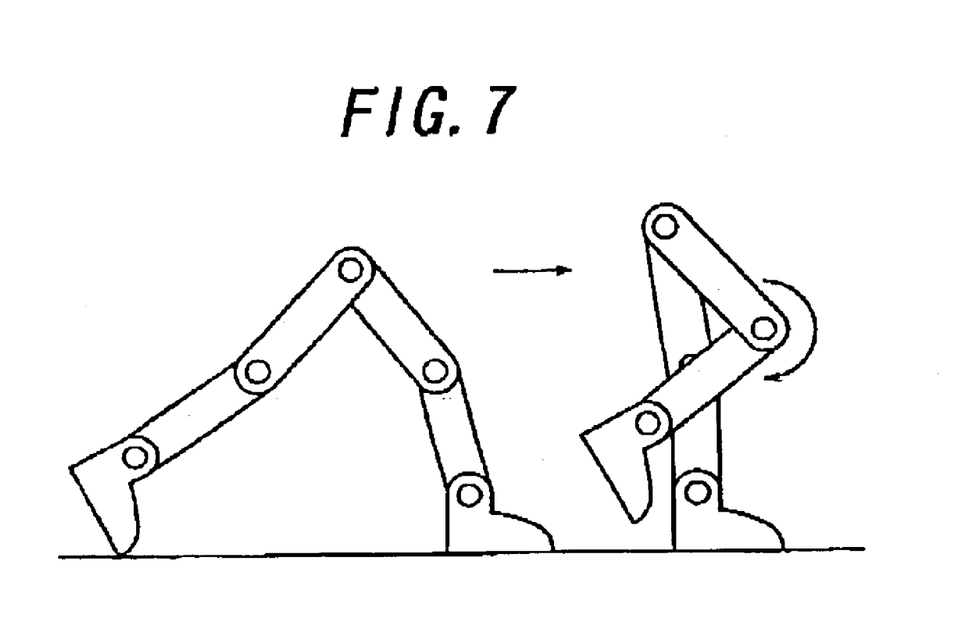
FIG. 7 is a schematic diagram showing a motion of a leg of humanoid robot after the leg is raised from the floor as a rear foot.
Figure 8:
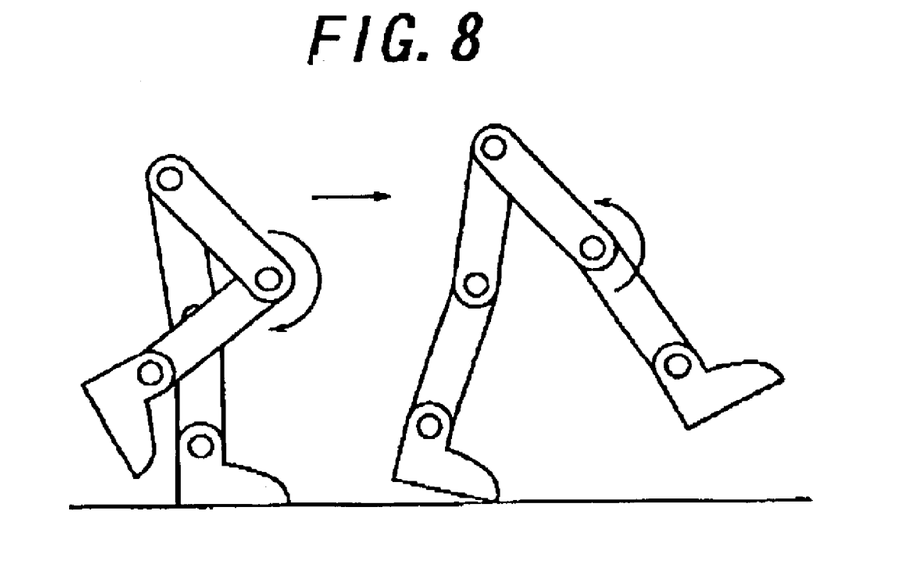
FIG. 8 is a schematic diagram showing a further motion of a leg in FIG. 7.

(1) First, as shown in FIG. 7, a femoral area (upper portion) of the leg is raised, and the knee joint is bent such that the lower leg will clear the ground when advancing forward; that is, so that the leg will not contact the ground;

(2) Second, as shown in FIG. 8, the knee is held out (extended) in order to pull up the lower leg.

Generally, in an adequately controlled knee joint, the above-mentioned bending and pulling up motion is controlled by controlling a rotation angle of the knee joint, and this joint represents desired paths given by the designer. However, since this motion of a knee joint is essentially natural motion that is generated by gravity and inertial force, it can be generated automatically by allowing the knee joint to have free motion. Consequently, it is understood that an effective walking motion of a humanoid robot can be achieved without extra force by realizing a free joint.

According to the backlash clutch of this embodiment, by using this clutch, the following advantageous effect is obtained:

(a) Achieve a free joint.

(b) Transmit a high torque when the clutch is in a coupled condition.

Moreover, according to the knee joint mechanism for a robot of this embodiment, the following advantageous effects are obtained:

(c) Realize a reaction force-following mechanism that follows the reaction force of a free joint.

(d) Absorb an impulsive force by means of the reaction force following motion of the reaction force-following mechanism.

(e) Avoid consumption of unprofitable energy.

While the present invention has been described above with reference to a specific embodiment shown in the accompanying drawings, this invention is not limited by the above-mentioned embodiment. In the mechanism of this invention, the first rotation member can be integrally fixed to the upper part of the leg, and the second rotation member can be rotatably supported by the lower part of the leg and driven by the driving means. Also, in this embodiment, the second rotation member is located inside of the first rotation member, and each of the radial extension surfaces of these members is configured at a convex part provided in an inner surface of the first rotation member and the outer surface of the second rotation member, respectively. Alternatively, the first and second rotation members may be located parallel to the direction of axis for rotation, and their radial extension surfaces may be formed at a convex part provided on the surface of the members that face each other.

Furthermore, the backlash clutch of the present invention can be applied to a mechanism other than a joint of a robot, and the joint mechanism for a robot can be used to realize a free swing motion of an arm of a robot rather than for a leg of a humanoid robot.

We claim:

1. A backlash clutch comprising:
   a first rotation member that rotates about a common axis and has a radial extension surface, said first rotation member being rotatably driven about the common axis by an external driving force; and
   a second rotation member that rotates about the common axis and has a radial extension surface, said second rotation member being arranged relative to said first rotation member with a backlash gap between the radial extension member of said first rotation member and the radial extension surface of said second rotation member,
   wherein driving rotation of said first rotation member rotatably drives said second rotation member about the common axis by engaging the radial extension surface of said first rotation member with the radial extension surface of said second rotation member, and
   wherein said second rotation member exhibits free rotation relative to said first rotation member within a range of the backlash gap.

2. The backlash clutch of claim 1, wherein said first rotation member comprises a plurality of radial extension surfaces, and said second rotation member comprises a plurality of radial extension surfaces corresponding to and respectively engageable with the plurality of radial extension surfaces of said first rotation member.

3. The backlash clutch of claim 2, wherein the plurality of radial extension surfaces of said first rotation member are arranged symmetrically around the common axis.

4. The backlash clutch of claim 1, wherein said first rotation member comprises at least one pair of radial extension surfaces arranged on opposing sides of the common axis, and said second rotation member comprises at least at least one pair of corresponding radial extension surfaces engageable with respective ones of the radial extension surfaces of said first rotation member.

5. The backlash clutch of claim 1, wherein said rotation member has a central opening and said second rotation member is arranged within the central opening of said first rotation member.

6. A robot joint mechanism comprising:
   a backlash clutch comprising:
      a first rotation member that rotates about a common axis and has a radial extension surface; and
      a second rotation member that rotates about the common axis and has a radial extension surface, said second rotation member being arranged relative to said first rotation member with a backlash gap between the radial extension member of said first rotation member and the radial extension surface of said second rotation member,
      wherein driving rotation of said first rotation member rotatably drives said second rotation member about the common axis by engaging the radial extension surface of said first rotation member with the radial extension surface of said second rotation member, and
      wherein said second rotation member exhibits free rotation relative to said first rotation member within a range of the backlash gap;
   a first joint member supporting said first rotation member for rotation about the common axis relative to said first joint member;
   a second joint member fixedly supporting said second rotation member and rotatable therewith about the common axis relative to said first joint member; and
   drive means that controls a driving rotation of said first rotation member about the common axis relative to said first joint member.

7. The robot joint mechanism of claim 6, wherein said drive means controls driving rotation of said first rotation member relative to said first joint member and said second rotation member so as to maintain driving engagement between the radial extension surface of said first rotation member and the radial extension surface of said second rotation member, to rotatably drive said second rotation member and said second joint member about the common axis.

8. The robot joint mechanism of claim 6, wherein said drive means controls driving rotation of said first rotation member relative to said first joint member and said second rotation member so as to maintain a gap between the radial extension surface of said first rotation member and the radial extension surface of said second rotation member, thereby to maintain free rotation of said second rotation member relative to said first rotation member.

9. The robot joint mechanism of claim 6, wherein said first joint member and said second joint member form a leg of the robot.

10. The robot joint mechanism of claim 6, wherein said first joint member and said second joint member form a robot arm.

11. The robot joint mechanism of claim 6, wherein said drive means comprises pulley means disposed on said first joint member for rotatably driving said first rotation member.

12. The robot joint mechanism of claim 6, wherein said drive means comprises a pulley disposed on said first joint member and a belt reeved about said pulley and said first rotation member.

* * * * *